Sept. 4, 1928.                                                          1,682,961
C. S. HALL
PRESSURE, TEMPERATURE, AND VOLUME INDICATING
AND CONTROLLING MEANS FOR AIRCRAFT
Filed March 6, 1926          2 Sheets-Sheet 1
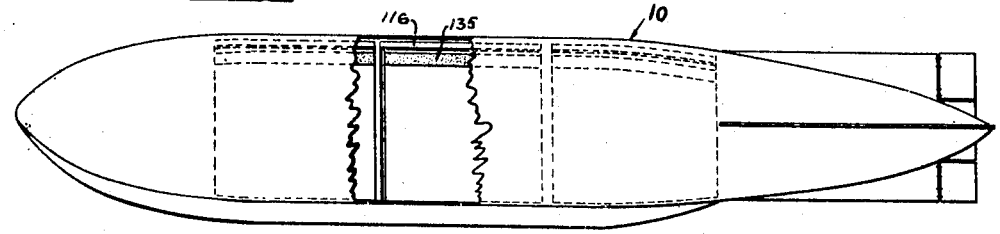
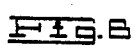
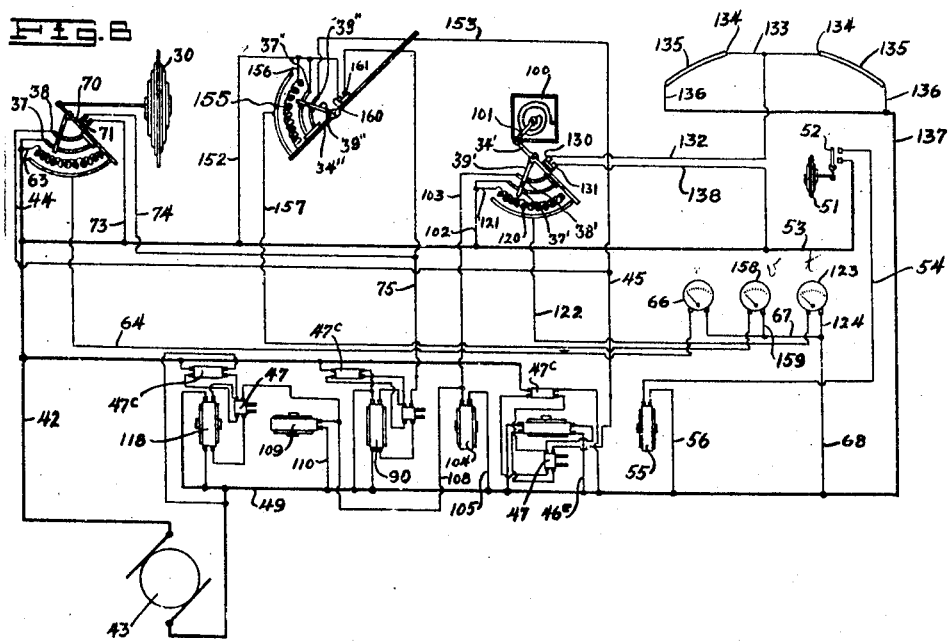
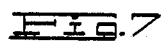
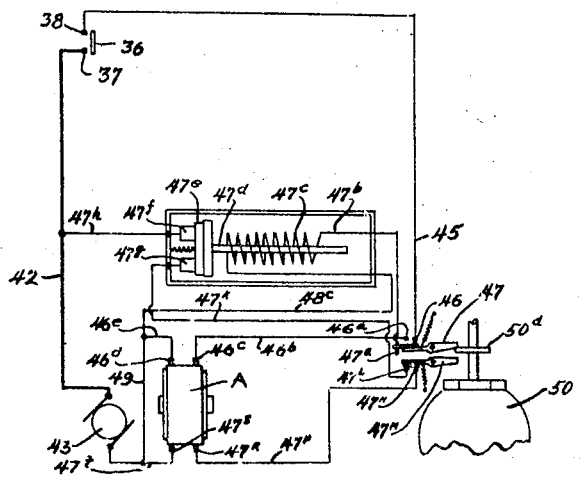
INVENTOR.
CHARLES S. HALL
BY
ATTORNEY.

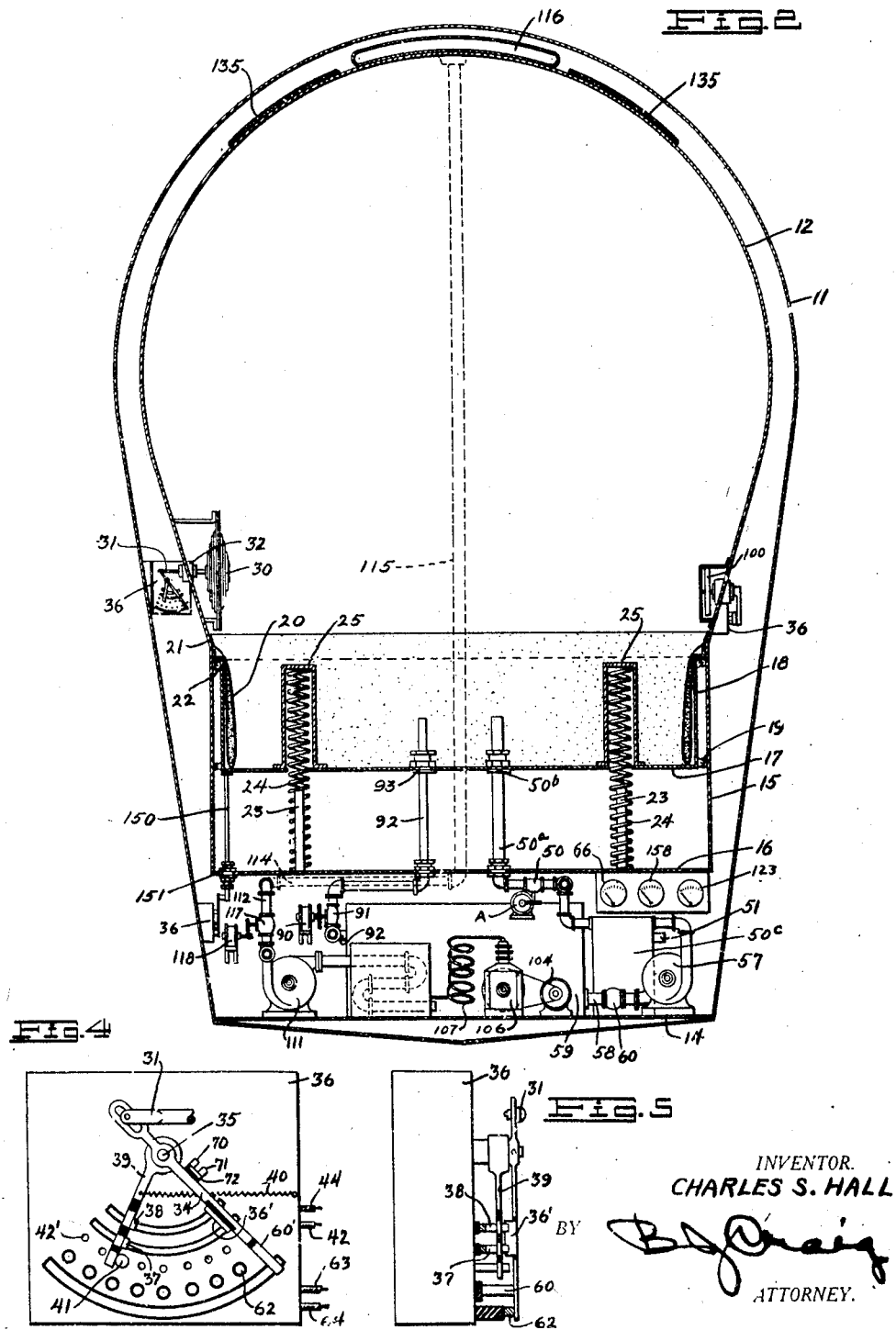

Patented Sept. 4, 1928.

1,682,961

UNITED STATES PATENT OFFICE.

CHARLES S. HALL, OF OAKLAND, CALIFORNIA.

PRESSURE, TEMPERATURE, AND VOLUME INDICATING AND CONTROLLING MEANS FOR AIRCRAFT.

Application filed March 6, 1926. Serial No. 92,791.

This invention relates to pressure, temperature, and volume indicating and controlling means for aircraft.

The general object of the invention is to provide a lighter-than-air aircraft with simple and efficient means for controlling and indicating the pressure and the temperature of the lifting gas and also for indicating the volume of gas in a lifting compartment.

A specific object of the invention is to provide a novel means for indicating the pressure of the lifting gas in a compartment of an aircraft.

An additional object of the invention is to provide novel means for indicating the temperature of the lifting gas in a compartment of an aircraft.

Another object of the invention is to provide novel means for indicating the volume of the lifting gas contained in the gas holding compartment of an aircraft.

A further object of the invention is to provide means for controlling the pressure of the gas in a compartment of an aircraft.

Another object of the invention is to provide a novel means for controlling the pressure and temperature of the lifting gas in an aircraft compartment.

A further object of the invention is to provide a novel means for controlling the volume of a gas compartment of an aircraft.

An additional object of the invention is to provide a novel means for controlling the pressure and volume of the lifting gas in a compartment of an aircraft.

Another object of the invention is to provide novel means for controlling the temperature and volume of a lifting gas in an aircraft.

Other objects of the invention will be apparent from the following description taken in connection with the accompanying drawings, wherein:

Fig. 1 is a side elevation, partly in section, showing an aircraft embodying the features of my invention;

Fig. 2 is a transverse sectional view through an aircraft embodying the features of my invention;

Fig. 3 is a sectional detail showing the means for controlling the valve mechanism;

Fig. 4 is a front plan view of a controlling member;

Fig. 5 is a side elevation of the controlling member;

Fig. 6 is a wiring diagram, and

Fig. 7 is an enlarged detail of one of the switches.

Referring to the drawing by reference characters, I have shown an aircraft generally at 10. The aircraft shown is of lighter-than-air type and is preferably of rigid or semi-rigid construction.

The aircraft comprises an outer envelope 11 having one or more gas holding compartments 12 therein. The outer envelope 11 is preferably rounded at its top surface and has more or less-parallel plane sides with a bottom portion which is also more or less plane. Upon the bottom portion of the outer member I arrange a suitable platform or base 14 on which the gas controlling mechanism, to be presently described, is mounted.

As shown, the inner container 12 is of rigid construction and is provided with a bottom portion 15 which is closed as at 16. Within this closed portion a movable member 17 is mounted. This movable member 17 includes a bottom portion having a flange 18 thereon which may be provided with rollers 19 which engage the walls of the portion 15. The movable member 17 is provided with a flexible gas excluding strip 20 which is secured at 21 to the relatively fixed member 12 and at 22 to the flange 18 so that as the member 17 moves up and down relative to the member 12 there will be no leakage of gas between the parts. The space between the closure 16 and the member 17 is in free communication with the atmosphere.

The member 16 is provided with a plurality of posts 23 on which springs 24 are mounted. These springs engage within cylindrical members 25 fixed within the member 17 so that normally there is a slight upward pressure on the member 17 so that this member will move upwardly when the gas pressure drops below a certain amount.

It is desirable that suitable means be provided for indicating the temperature, pressure and volume of the lifting gas and also that means be provided for controlling the temperature, pressure and volume of the lifting gas either jointly or independently. In order to bring this about, I provide suitable mechanism which includes a pressure actuated diaphragm 30. This diaphragm 30 is arranged within the container 12 and is provided with an operating rod 31 which passes through a suitable packing member 32 to the exterior of the container.

The rod 31 is connected to an operating member 34 which is pivoted on a shaft 35 on a plate 36 which is secured to the outer envelope 11. This operating member 34 is provided with a circuit closure 36' which is adapted to engage two spaced terminals 37 and 38 and close a circuit across these terminals which are fixed on an arm 39 which is movable about the axis of the shaft 35. By shifting the arm 39 the pressure at which the member closes the circuit will be varied as will be readily understood. A spring 40 normally moves the arm 39 to the right in Fig. 4. This spring holds the member 39 against a stop member 41 which may be adjustably inserted in any one of a number of apertures 42'.

The member 31 will move as the pressure within the compartment 12 varies, supposing that the arm 39 has been set in the position shown in Fig. 4, and that the pressure in the compartment 12 is increasing. The member 34 will move to close the circuit through the leads 37 and 38 when the pressure reaches a predetermined amount. The member 37 is connected by a lead 42 with a source of electricity 43. The member 38 is connected by a lead 44 with a lead 45. The lead 45 is in turn connected to one terminal 46 of a circuit closing device, the other terminal of which is shown at 46ᵃ. The terminal 46ᵃ is connected by a lead 46ᵇ with a terminal 46ᶜ of a motor A, the other terminal 46ᵈ of which is connected by a lead 46ᵉ with a lead 49 which is in circuit with the generator 43. A circuit closer is shown at 47 for bridging the terminals 46 and 46ᵃ. This circuit closer is pivotally mounted and is adapted to be held normally in circuit closing position by a spring so that when the circuit is closed through the terminals 37 and 38 the motor A will be operated. The motor A is reversible and is adapted to open and close a valve 50. This valve 50 is on a pipe 50ᵃ which passes into the compartment 12 through a packing member 50ᵇ and which is connected to an auxiliary container 50ᶜ, so that as soon as the pressure rises to a certain amount this auxiliary container will be placed in communication with the compartment 12 and the gas will be allowed to escape to the auxiliary container to relieve the pressure in the compartment 12.

When the pressure in the auxiliary container 50ᶜ reaches a certain amount this pressure will act on a control member 51 in the compartment 50ᵉ. This control member includes a switch 52. One terminal of the switch 52 is connected by a lead 53 with the lead 42 while the other terminal is connected by a lead 54 with one terminal of a motor 55. The other terminal of the motor 55 is connected by a lead 56 with the lead 49. The motor 55 drives a gas pump 57 the intake of which is connected to the auxiliary tank 50ᶜ, and the outlet of which is connected by a pipe 58 with a high pressure gas storage tank 59. The pipe 58 includes a one-way valve 60. It will thus be apparent that continued high pressure in the compartment 12 will result in gas being led from this compartment and stored in the high pressure container 59.

As soon as the pressure in the container 12 drops to a certain amount the diaphragm 30 will move until the member 31 has moved to the left in Fig. 4 to open the circuit through the leads 37 and 38. The valve 50 has a member 50ᵈ thereon which moves when the motor A opens the valve to engage the pivoted member 47 and moves this member 47 so that the circuit is opened across the terminals 46 and 46ᵃ, thereby cutting off the current from the motor A leaving the valve 50 open.

The terminal 46 is an elongated one and the member 47 is adapted to remain in contact with this terminal 46 after it has left the terminal 46ᵃ. Adjacent the terminal 46ᵃ is a terminal 47ᵃ which is connected by a lead 47ᵇ with one terminal of a solenoid 47ᶜ the other terminal of which is connected by a lead 48ᶜ with the lead 49 previously described.

The terminal 47ᵃ will be in circuit with the terminal 46 through the circuit closer 47 when this circuit closer closes the circuit across the terminals 46 and 46ᵃ and also after the circuit across the terminals 46 and 46ᵃ is opened by the member 50ᵈ. The solenoid 47ᶜ will thus remain energized when the valve 50 is opened and as long as there is current in the lead 45. The solenoid 47ᶜ has a core 47ᵈ which has a circuit closer 47ᵉ thereon. This circuit closer 47ᵉ is adapted to bridge two terminals 47ᶠ and 47ᵍ. The terminal 47ᶠ is connected by means of a lead 47ʰ with the lead 42 while the terminal 47ᵍ is connected by a lead 47ᵏ with one terminal 47ˡ of a circuit closing device 47ᵐ the other terminal of which is shown at 47ⁿ. The circuit closing device 47ᵐ is pivoted and is adapted to be opened by the member 50ᵈ when the valve is closed and is normally closed by a spring when the valve is open.

The circuit closing member 47ᵉ is normally urged to closed position by a spring but is held open as long as current is supplied by the lead 45.

When the pressure decreases and moves the diaphragm 30 to open the circuit closer across the leads 37 and 38 the solenoid 47ᶜ will release the circuit closer 47ᵉ which will move to closing position so that the circuit will be complete from the lead 42 through the lead 47ᵏ to the terminal 47ⁿ. The terminal 47ⁿ is connected by a lead 47ᵖ with one terminal 47ʳ of the motor A, the companion terminal 47ˢ of which is connected by a lead 47ᵗ with the generator 43 so that the motor A will be reversed and will open the valve until the member 50ᵈ rocks the circuit closer 47ᵐ to open the circuit. The pressure in the auxiliary container 50ᶜ will then drop and the motor 55 will stop.

The member 34 is provided with a contact 60' which is adapted to engage terminals 62 of a rheostat. This rheostat is in circuit through a lead 63 with the lead 42. The rheostat is also connected by a lead 64 with one terminal of an indicating member 66. The other terminal of the indicating member is connected to a lead 67 which is connected to a lead 68 connected to the lead 49. Thus it will be apparent that as the diaphragm moves the member 34 the pressure will be indicated on the indicating member described.

Arranged upon the plate 36 I show a pair of spaced terminals 70 and 71. The arm 34 carries a circuit closer 72 (see Fig. 4) which is adapted to bridge the terminals 70 and 71 when the arm has moved to the extreme right position as shown in Fig. 4. It will be here stated that the normal position of the arm will be such that it will be spaced from the terminals 70 and 71 and also from the contacts 37 and 38 so that it will be free to move in either direction from the normal position.

The terminal 71 is connected by a lead 73 with the lead 53, and the terminal 70 is connected to a lead 74. The lead 74 is connected to a lead 75 which is connected to a reversible motor 90. This reversible motor 90 operates a valve 91 in a pipe 92 which connects the high pressure tank 59 with the compartment 12. The pipe 92 passes through a packing member 93 in the movable closure member 17.

The reversible motor 90 is operated in a forward and a reverse direction by means of a circuit closer 47, solenoid 47ᶜ and associated parts in a manner substantially identical with that described in connection with the operation of the motor A and further description of this motor operating mechanism is believed to be unnecessary.

From the foregoing description it will be apparent that when the pressure in the compartment 12 drops to a certain amount the motor 90 will operate to allow compressed gas in the container 59 to pass into the compartment 12 and that when the pressure in the compartment 12 has been raised to a certain amount the motor 90 will close the valve.

In order to indicate and control the temperature of the gas in the compartment 12 I provide a thermostat 100. The operating arm of this thermostat 100 is shown at 101 and this arm is connected to an arm 34' which is similar in all respects to the arm 34 previously described. Associated with the arm 34' is an arm 39' which is similar in all respects to the arm 39 previously described. The arm 39' is provided with a pair of spaced terminals 37' and 38'. The arm 39' is adjustable in the same manner as the arm 39 and the terminal 37' is connected by a lead 102 with the lead 53. The terminal 38' is connected by a lead 103 with one terminal of a motor 104, the other terminal of the motor being connected by a lead 105 with the lead 49. It will thus be apparent that when the temperature of the gas in the compartment 12 rises to a certain amount the thermostat will cause the circuit closer on the arm 34' to bridge the terminals 37' and 38' thereby closing the circuit to the motor 104. The motor 104 is adapted to drive a compressor 106 of a cooling device 107. The lead 103 is connected to a lead 108 which is connected to one terminal of a motor 109, the other terminal of which is connected by a lead 110 with the lead 49. It will thus be apparent that the motor 109 will operate when the motor 104 operates.

The motor 109 drives a blower 111 which is connected by a pipe 112 with a pipe 114. This pipe 114 is connected with a pipe 115 which is in communication with an arcuate hollow cooling receptacle 116 arranged exteriorly of and above the compartment 12. This cooling receptacle extends longitudinally of the compartment 12 and is provided at each end with a relief valve (not shown) which is vented to the atmosphere. It will thus be apparent that when the temperature reaches a certain point cooled air will be forced through the member 116 to cool the lifting gas.

The flow of gas through the pipe 112 is controlled by a valve 117. This valve is controlled by a reversible motor.

Current is supplied by the motor 118 from the lead 108 and the circuits to the motor include a switch 47 and the solenoid operated switch 47ᶜ similar to that previously described, and a further description of this particular portion is believed to be unnecessary.

The thermostat control includes a rheostat 120 which is connected by a lead 121 with the lead 102 and is also connected by a lead 130

122 with one terminal of a temperature indicating member 123. The other terminal of the temperature indicating member 123 is connected by a lead 124 with the lead 68 previously described so that as the arm 34 moves, due to the temperature variations, these temperature variations will be indicated by the indicator 123.

The arm 34' includes a circuit closer which when the arm is in the position shown in Fig. 6 closes the circuit across two terminals 130 and 131. The arm will assume this position only when the temperature has dropped to a certain point. The terminal 130 is connected by a lead 132 with a lead 133 which is connected to the terminals 134 of electric heating elements 135. These heating elements are also connected by leads 136 with a lead 137 connected to the lead 49. The terminal 131 is connected by a lead 138 with the lead 53. It will thus be apparent that when the terminals 130 and 131 are bridged the heating elements 135 will be energized. These heating elements 135 are shown as arranged upon the exterior of the compartment 12 and the construction is such that these heating elements will be operated when the temperature in the compartment 12 drops to a certain point.

In order to control and indicate the volume of gas within the compartment 12 I mount a rod 150 on the movable member 17. This rod 150 passes through a packing member 151 and engages an arm 34". This arm 34" is associated with an adjustable arm 39" and the two arms are provided with circuit closers, switches, and rheostats similar to the members 34 and 39 previously described.

The device includes a terminal 37" which is connected by a lead 152 with the lead 53 and a terminal 38" which is connected by a lead 153 with the lead 45 previously described and the construction is such that when the closure 17 moves down the circuit will be closed across the members 37" and 38" to close the circuit.

The arm 34" has a rheostat 155 associated therewith. The rheostat includes a lead 156 to the lead 152 and a lead 157 to a volume indicator 158 from which a lead 159 extends to a lead 67. It will thus be apparent that movement of the member 17 will be indicated by the indicator 158 by the mechanism just described.

Associated with the arm 34" are a pair of terminals 160 and 161 which are adapted to be bridged by a contact on the arm 34".

The terminal 160 is connected to the lead 152 while the terminal 161 is connected to the lead 75, so that when the closure member moves upwardly to a certain position the circuit will be closed to the motor 90 to thus cause additional gas to be led into the compartment 12.

From the foregoing description it will be apparent that I have provided an aircraft wherein the gas holding compartment will normally remain of substantially the same volume notwithstanding temperature and pressure changes of the gas within the compartment and will be further apparent that should small leaks develop in the gas holding compartment that the compartment will be supplied with gas to compensate for the leaks, thus maintaining a substantially uniform volume. When greater volume or less volume is desired, this may be brought about by adjusting the controlling mechanism previously described. Great freedom of control is provided with my invention.

Having thus described my invention, I claim:

1. An aircraft having gas holding compartment therein, means enabling the size of said compartment to be varied, an indicating station, and means connecting said indicating station and said compartment and adapted to indicate the relative volume of gas in the compartment.

2. An aircraft having gas holding compartment therein, means to vary the size of said compartment, an indicating station, and means connecting said indicating station and said compartment, and adapted to indicate the volume of gas in the compartment and other means to decrease the volume of gas in the compartment.

3. An aircraft having a gas holding compartment therein, means to vary the capacity of said compartment, means to indicate the volume of the compartment, means to withdraw gas from said compartment, and means whereby the withdrawing means will be operated when the volume of the compartment increases beyond a certain point.

4. An aircraft having a gas holding compartment therein, means to vary the size of said compartment, an indicating station, means connecting said indicating station and said compartment and adapted to indicate the volume of gas in the compartment and other means to increase the volume of gas in the compartment.

5. An aircraft having a gas holding compartment therein, heating means associated with said compartment, cooling means associated with said compartment, temperature responsive means associated with said compartment, means operated by said last mentioned means for operating the heating means when the temperature reaches a certain point and other means for operating the cooling means when the temperature reaches another certain point.

6. In a device of the class described, an aircraft having a gas holding compartment therein, means associated with the gas holding compartment for indicating the gas pressure therein, means to decrease the gas pressure when it reaches a certain amount, means to increase the gas pressure when it reaches a certain amount, and means to automatically control the point at which the gas pressure is increased or decreased.

7. An aircraft having a rigid gas holding compartment therein, means to mount one wall of said compartment for movement to vary the capacity of said compartment, means to supply gas to said compartment, means to withdraw gas from said compartment, and means whereby the supply means will be operated when the volume of the compartment decreases beyond a certain point and other means whereby the withdrawing means will be operated when the volume of the compartment increases beyond a certain point.

8. In an aircraft, a gas holding compartment, said gas holding compartment including a movable wall portion, means to supply gas to said compartment, means to withdraw gas from said compartment, and control means associated with said movable wall portion to control each of said first two mentioned means to thereby maintain a substantially fixed volume of gas in said compartment regardless of temperature and pressure changes in the wall of the compartment.

9. In an aircraft including a gas holding compartment, means to control the temperature of said compartment, means to remove gas from said compartment, means to supply gas to said compartment and means whereby changes in pressure in said compartment will actuate said removing and supplying means.

10. In an aircraft including a gas holding compartment, means to remove gas from said compartment, means to supply gas to said compartment and means whereby changes in pressure, temperature or volume of said compartment will actuate said moving and supplying means.

11. In an aircraft including a gas holding compartment, said compartment including a wall portion movable to vary the size of the compartment and means associated with said variable portion for indicating the volume of the compartment and means to maintain a substantially uniform temperature in said compartment.

12. In an aircraft including a gas holding compartment, said compartment including a wall portion movable to vary the size of the compartment and means associated with said variable portion for indicating the volume of the compartment, means to cool said compartment and means to heat said compartment.

13. In an aircraft including a gas holding compartment, said compartment including a wall portion movable to vary the size of the compartment and means associated with said variable portion for indicating the volume of the compartment, means to cool said compartment, means to heat said compartment, means to remove gas from said compartment and means to supply gas to said compartment.

14. In an aircraft including a gas holding compartment, said compartment including a wall portion movable to vary the size of the compartment and means associated with said variable portion for indicating the volume of the compartment, means to cool said compartment, means to heat said compartment, means to remove gas from said compartment, means to supply gas to said compartment and means whereby changes in pressure, temperature and volume of said compartment will actuate said removing and supplying means.

15. In an aircraft, a gas holding compartment, an indicating station remote from said compartment, indicating means at said station for indicating both the temperature and pressure of the gas in the compartment, means connecting said indicating means with the compartment for actuating the indicating means and means to vary the pressure of gas in the compartment.

16. An air craft having a gas holding compartment therein, automatic pressure responsive means associated with said compartment, a station remote from said means and electrically operated means at said station connected with said first mentioned means for indicating the pressure in said compartment.

17. An aircraft having a gas holding compartment therein, said compartment including a movable portion, a member automatically responsive to movement of said portion, a station remote from said member and electrically operated means at said station connected with said member for indicating the changes in volume of said compartment.

18. An aircraft having a gas holding compartment therein, heat responsive means, volume responsive means and pressure responsive means all associated with said compartment, a station remote from said means and means at said station connected with said first mentioned means for indicating the temperature volume and pressure of the contents of said compartment.

19. In a device of the class described, an aircraft having a gas holding compartment therein, means associated with the gas holding compartment for indicating the gas pressure therein, automatic means to decrease the gas pressure when it reaches a certain amount, and means to change the pressure at which the automatic means is actuated to decrease the pressure.

20. In an aircraft, a gas holding compartment and means associated with said compartment for supplying gas to said compartment, means for removing gas from said compartment, means to actuate the first means when the volume of the compartment increases and means to actuate said second means when the volume of the compartment decreases and thereby maintain a substantially fixed volume of gas in said compartment regardless of temperature and pressure changes outside of the compartment.

In testimony whereof, I hereunto affix my signature.

CHARLES S. HALL.